US009793665B2

(12) United States Patent
Hernandez

(10) Patent No.: US 9,793,665 B2
(45) Date of Patent: Oct. 17, 2017

(54) BAR JUICE ELECTRONIC DEVICE CONNECTION SYSTEM

(71) Applicant: Eric Guzman Hernandez, Arlington, VA (US)

(72) Inventor: Eric Guzman Hernandez, Arlington, VA (US)

( * ) Notice: Subject to any disclaimer, the term of this patent is extended or adjusted under 35 U.S.C. 154(b) by 0 days.

(21) Appl. No.: 15/004,360

(22) Filed: Jan. 22, 2016

(65) Prior Publication Data

US 2017/0214196 A1    Jul. 27, 2017

(51) Int. Cl.
*H02J 1/00* (2006.01)
*H01R 25/00* (2006.01)
*H01R 13/66* (2006.01)
*H02J 7/00* (2006.01)

(52) U.S. Cl.
CPC ....... *H01R 25/003* (2013.01); *H01R 13/6675* (2013.01); *H02J 2007/0062* (2013.01)

(58) Field of Classification Search
CPC .................. H01R 25/008; H02J 2007/0062
See application file for complete search history.

(56) References Cited

U.S. PATENT DOCUMENTS

2014/0111143 A1* 4/2014 Sells .................. H02J 7/0029
                                              320/107
2016/0224064 A1* 8/2016 Fleisig ................ G06F 1/1632

* cited by examiner

*Primary Examiner* — Daniel Cavallari
(74) *Attorney, Agent, or Firm* — Patent CEO LLC; Phillip Vales

(57) ABSTRACT

A power strip is scalable to provide multiple connection points within an eatery, bar or similar locale. An input power socket provides power for an individual strip while a similar output power socket provides power for a succeeding power strip in a group of strips. USB connection ports located within the power strip are utilized to power USB enabled devices attached thereto. A power regulation circuit provides appropriate power to the connection ports.

20 Claims, 3 Drawing Sheets

BAR JUICE ELECTRONIC DEVICE CONNECTION SYSTEM

FIELD OF THE INVENTION

The present invention relates to an electronic device connection system. More particularly, the present invention relates to a expandable power connection system for USB devices.

BACKGROUND OF THE INVENTION

Battery-powered portable electronic devices providing a variety of functions are ubiquitous. Some examples of mobile devices powered by internal rechargeable batteries are cellular phones, smart phones, tablets, personal computers and digital assistants, music players, headphones and speakers, and calculators.

Cellular telephones and similar portable devices routinely come equipped with one or more Universal Serial Bus (USB) ports. The USB port facilitates internal battery charging when a suitable charging unit and cable connector is applied to the USB port.

Thus, mobile devices often include a separate charging unit which coverts AC mains power to DC voltages that are used to recharge the internal batteries. If the mobile user happens to be located near a main power outlet, then the charging unit can be plugged into the wall and the charging cable can likewise be connected to the battery-powered device needing to be recharged.

However, many public facilities do not provide convenient access to AC mains power for customers and visitors. Additionally, installing AC main power outlets in some facilities may not be feasible and high voltage AC main power may be deemed hazardous in some environments.

Thus, there is a need for a solution that overcomes this difficulty that is scalable, easy to deploy and cost effective and that takes advantage of existing mobile technology.

SUMMARY OF THE INVENTION

The present invention overcomes the deficiencies of the known art and the problems that remain unsolved by providing An expandable power distribution device comprising:
a housing having
an electronic support device attached therein
an input dc power port capable of receiving DC power different than a USB voltage attached to the electronic support device
an output dc power port capable of transmitting DC power different than a USB voltage attached to the electronic support device and
a first USB charging port attached to the electronic support device.
In another aspect, a power regulation device attached to the input dc power port.
In another aspect, a power regulation device attached to the output dc power port.
In another aspect, wherein the housing further comprises:
a linear housing.
In another aspect, wherein the input dc power port is located at an end of the electronic support device.
In another aspect, wherein the output dc power port is located at an end of the electronic support device.
In another aspect, wherein the input dc power port is located at an end of the electronic support device and the output dc power port is located at an opposite end of the electronic support device.
In another aspect, wherein the input dc power port is located at an end of the electronic support device.
In another aspect, wherein the output dc power port is located at an opposite end of the electronic support device.
In another aspect, further comprising a second USB charging port attached to the electronic support device.
In another aspect, wherein the electronic device has two narrow ends and two longitudinal sides.
In another aspect, wherein the first USB charging port is located on a longitudinal side of the electronic support device.
In another aspect, further comprising:
a second USB charging port located on a longitudinal side of the electronic support device.
In another aspect, wherein the first USB charging port and the second USB charging port are on the same longitudinal side of the electronic support device.
In another aspect, wherein the first USB charging port and the second USB charging port are on opposite longitudinal sides of the electronic support device.

A power cascading strip comprising:
a first device compartment having
a first opening in the first device compartment for the placement therein of
a first DC power beyond USB voltage connection device capable of receiving DC power different than a USB voltage therein where the first DC power beyond USB voltage connection device is attached to a circuit board located within the first device compartment and
a second opening in the first device compartment for the placement therein of
a second DC power beyond USB voltage connection device capable of transmitting DC power different than a USB voltage therein where the second DC power beyond USB voltage connection device is attached to the circuit board and
a third opening in the first device compartment for the placement therein of a first USB charging power port attached to the circuit board.
In another aspect, a fourth opening in the first device compartment for the placement therein of a second USB charging port attached to the circuit board.
In another aspect, a power regulator circuit integrated with the circuit board.
In another aspect, further comprising:
a second device compartment distinct from the first device compartment such that the second device compartment has
a fourth opening in the second device compartment for the placement therein of
a third power connection device capable of receiving DC power different than a USB voltage therein where the third power connection device is attached to another circuit board located within the second device compartment wherein the third power connection device is connected to the second DC power beyond USB voltage connection device; and
a fifth opening in the second device compartment for the placement therein of
a fourth power connection device capable of transmitting DC power different than a USB voltage therein where the fourth power connection device is attached to the another circuit board; and a sixth opening in the second device compartment for the placement therein of a second USB charging power port attached to the another circuit board.

A linear power strip assembly comprising:

an oblong circuit board situated within the linear power strip assembly having a first power connection socket capable of receiving DC power outside a normal operating range of a USB voltage attached to the oblong circuit board a second power connection socket capable of transmitting DC power outside a normal operating range of a USB voltage attached to the oblong circuit board and a USB charging socket also attached to the oblong circuit board.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

Figure 1:
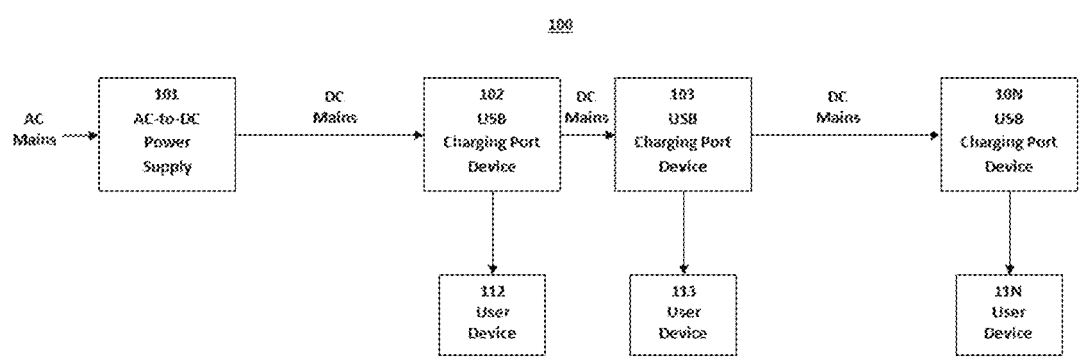
FIG. 1 is a block diagram depicting a dedicated USB charging port device and power distribution system in accordance with an embodiment presented herein.

The following detailed description is merely exemplary in nature and is not intended to limit the claimed embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in each figure.

Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The functionality of the various example embodiments will be explained in more detail in the following description, read in conjunction with the figures illustrating the various details of the novelties taught herein.

In its most general embodiment, a Bar Juice power strip comprises an input power port for acceptance of a DC main connector and one or more USB connector ports for reception of USB connector devices from USB enabled devices. Additionally, the power strip would include other necessary electronic circuitry for the charging of the connect USB devices as well as an output power port for connection to a DC main connector to a second Bar Juice power strip. Of course a bar, establishment, coffee house or similar locale would have a cascade of these arranged about its interior so as to facilitate charging of various devices therein.

Thus, the present concept envisions a device that is similar to an extension cord that can charge mobile phones and other devices equipped with USB ports and/or USB-enabled charging cables. This device, or charging module, is particularly applicable in taverns and restaurants where it could be located, for example, underneath a bar, counter or table. It would also be applicable underneath or around an island or counter in a home. The device is easy to install, fit into available spaces and optionally includes a visible indicator to advise users of its presence.

The electronic circuitry of the charging module can provide the proper DC voltage and current to each and every USB charging port. The mechanical configuration of the charging module is easily scalable, deployable and modifiable to accommodate various applications. Finally, the devices and systems described herein enable a safe method for charging USB-equipped mobile devices in locations with limited access to AC power mains.

FIG. 1 is a block diagram depicting a dedicated USB charging port device and power distribution system in accordance with an embodiment presented herein. The AC-to-DC power supply 101 converts AC mains power to DC mains power within a lower and safe range, typically less than 48 volts DC. One or more USB charging port devices 102, 103, . . . , 10N may be connected to the DC mains at intervals along the span to be accessible to users. Each USB charging port device contains circuitry which converts the DC power mains to the proper voltages and currents for charging batteries, which is then routed to one or more USB connectors mounted on the module.

Users may be alerted to the presence of USB charging port devices 102, 103, . . . , 10N by visible indicators mounted on the modules. Users wishing to charge their mobile devices 112, 113, . . . , 11N may plug the charging cables associated with their devices into the USB connectors mounted on the modules.

Figure 2:
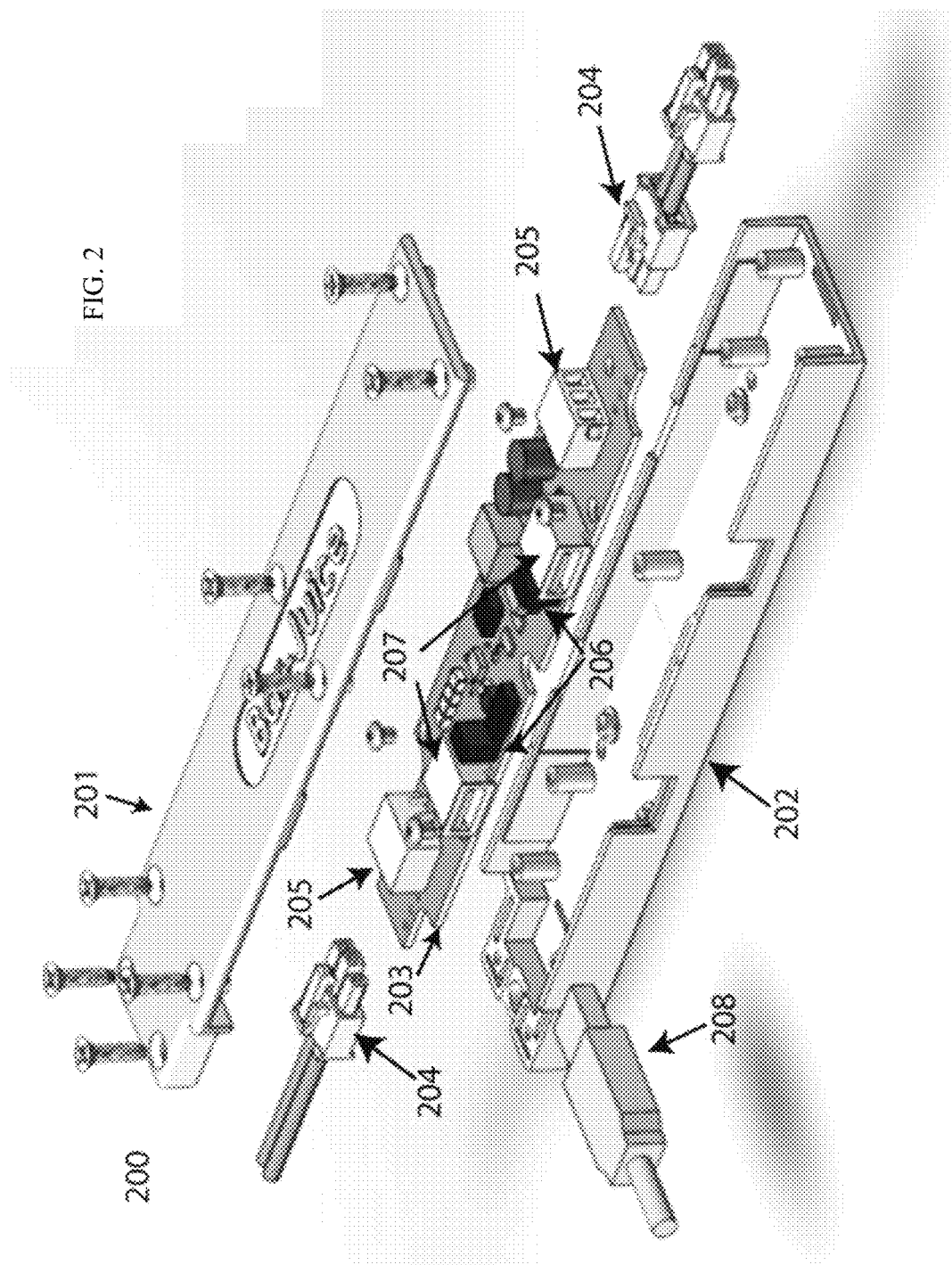
FIG. 2 is an assembly diagram depicting various components of a USB charging port device in accordance with an embodiment presented herein.

FIG. 2 is an assembly diagram depicting the mechanical configuration of a USB charging port device 200 in accordance with an embodiment presented herein. It should be appreciated that this embodiment is one of many possible module configurations for the dedicated USB charging port device and power distribution system more generally described herein. For example, there may be more or less than two USB charging port connectors on each module, and the type of USB connectors mounted on the module may be any of the basic kinds or sizes established by the USB standard which support power to enable battery charging.

The module includes faceplate 201 and housing 202 molded so that the faceplate 202 fits onto a ledge running along the interior top periphery of the housing 202; this ledge is interrupted at various locations so as to provide space for USB ports 207 and other similar components such as DC connector 205; this connector is duplicated at the opposite end of the circuit board 203 so that a follow on module can be easily connected thereto. The module also includes a printed circuit board 203 containing circuitry, components and connectors necessary to perform USB charging port functions. Various screws are placed in holes on the faceplate 201 and on into corresponding threaded holes in the housing thereby locking the two together with the printed circuit board 203 there between. A mounting surface is provided for printed circuit board 203 according to the dimensions and shape thereof.

Electrical power is supplied to the module via DC mains power cable/plug 204 that is engaged into power connector 205 mounted onto printed circuit board 203. Also located thereon are visual indicators (Light Emitting Diodes, LEDs) 206; these are associated with USB ports 207 and are used to alert users of the presence and availability of USB charging ports on module 200. USB ports 207 are positioned on printed circuit board 203 and provide USB charging port functionality to USB plug 208 from a mobile USB supporting device. USB plug 208 is attached to one end of a cable, the opposite end of which is attached to another USB connector or other electrical connector compatible with the mobile device needing to be charged.

Figure 3:
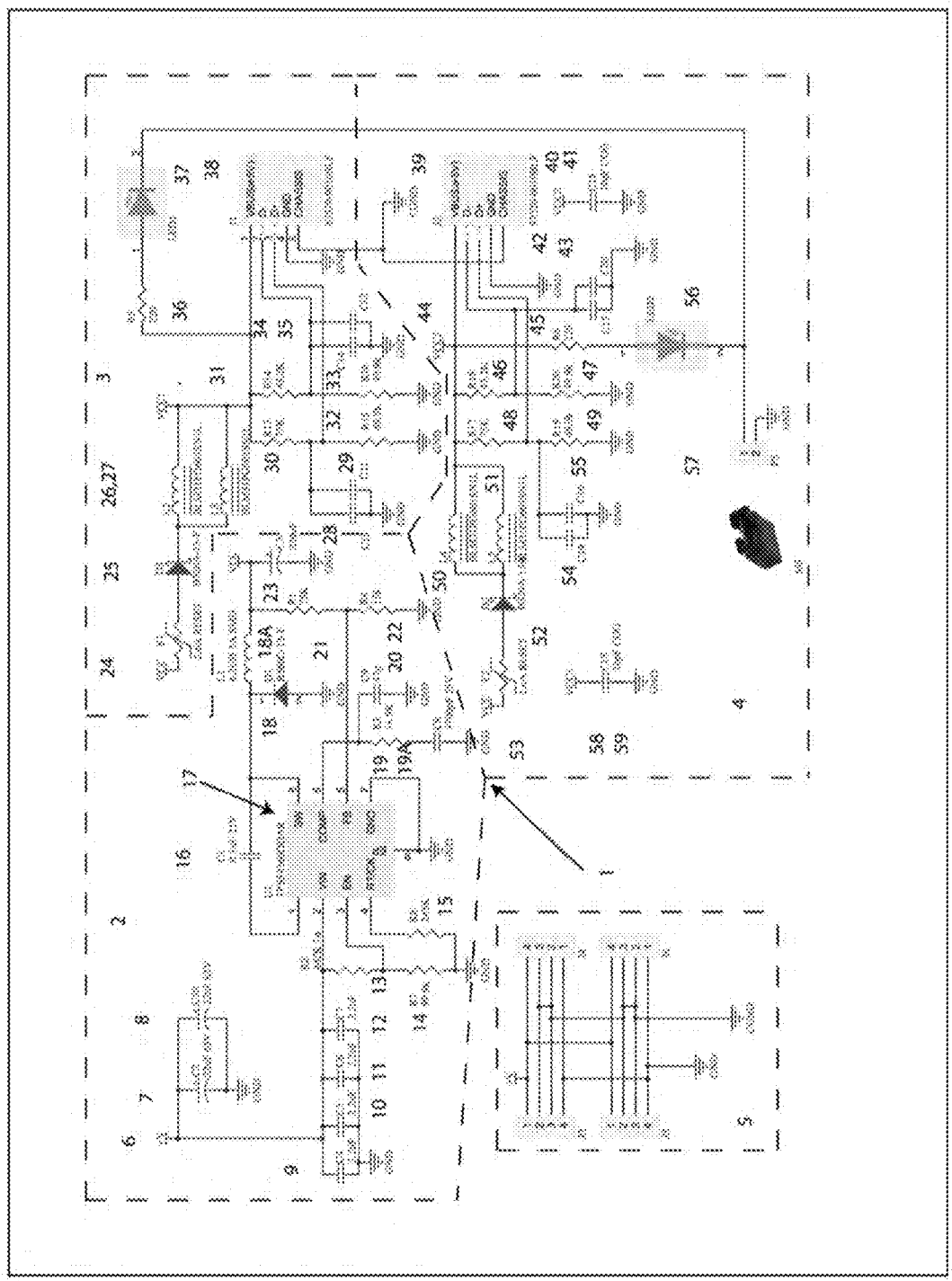
FIG. 3 is a schematic diagram depicting electronic circuitry of a USB charging port device in accordance with an embodiment presented herein.

FIG. 3 is a schematic diagram depicting electronic circuitry of a USB charging port device in accordance with one or more embodiments presented herein. The system is logically divided into five main components as described below. The overall schematic of the USB charging system known herein as 'Bar Juice' is represented as item 1. This system 1 has a step down regulator 2 for the charging system whilst 3 generally represents the electrical circuit for distribution of the regulated, fused and inductively isolated voltage to USB connector J1. Similarly, item 4 represents the electrical circuit for distribution of the regulated, fused and inductively isolated voltage to USB connector J2. Finally a schematic representation 5 of the input to output connectors for the primary voltage to other USB connector ports 60-63, J3-J6 on other strips.

+V (6) is the primary distributed DC voltage for the system that has been designed to allow for voltages from 4.5V to 60V. Attached to this voltage node are filter parallel capacitors 7, 8 (C2, C10, 22 uf) that have their other ends grounded. These general input filter capacitors 7,8 serve the purpose to minimize noise of the input distribution voltage and ensure the switching operation of the regulator will be unimpeded. Various other smaller input filter capacitors 9-12 (C4-C7, 2.2 uf) are connected at one end to +V (6) and arranged in parallel with their other ends grounded. Again their purpose is the ensure proper switching of the regulator, as well as eliminate higher frequency harmonics for the system.

A voltage regulator chip 17 (TPS54560 DDAR) provides the basis voltage necessary for USB charging and is connected with various devices as follows. A resistor 13 (R2, 442 k) forms an upper portion of a voltage divider network for the regulator, as well as an under voltage lockout for the distributed DC voltage. It is connected at one end to pin 2 (Vin) of the Voltage Regulator chip 17 as well as to the +V (6) that is also connected to the filter capacitors 7-12; its other end is connected to resistor 14 (R7, 90.9 k) and to EN pin 3 of chip 17; this other resistor 14 is the lower portion of the voltage divider network having its value selected to keep the EN pin above 1.2V. The other end of resistor 14 is grounded and also connected to resistor 15 (R8, 243 k) that sets the switching frequency of the regulator on pin 4 RT/CK. Pins 9 EP and 7 GND of chip 17 are grounded together.

Pin 1 (B) of chip 17 is attached to one end of capacitor 16 (0.1 uf 25V) and its other end is connected to pin 8 (SW) thereof. This capacitor is designed to provide voltage to the BOOT pin on the regulator thereby enabling the output. A clipping diode 18 (D1) is connected to the pin 8 of chip 17 and capacitor 16 thereby eliminating negative voltages generated by the inductor L1 18A (8.2 uH) also connected to pin 8 and the same contact point of capacitor 16 just described. Pin 6 of chip 17 is connected to one end of resistor 19A R3 16.9 k at the same nodal point as one end of Capacitor 20. Also, a capacitor 19 C8 4700 pf has one end connected to the other end of resistor 19A and the capacitor 19 has its other end grounded. Capacitor 19 filters noise by covering both the R3 and C8 junction. This filters the regulator (noise filtration)—compensation on the regulator.

Capacitor 20 (C9, 47 pf) is a frequency compensation capacitor for the high frequency aspects of the Error Amplifier connected at one end to pin 6 of chip 17 and grounded at its other end. Resistor 21 (R1, 75 k) is an upper portion of a voltage divider network used for setting the output voltage of VCC (VCC is nominally 5.2V) connected at one end to the other end of 18A, to an end of capacitor 23. The other end of resistor 21 is connected to pin 5 of chip 17 also connected to resistor 22 (R4, 13 k) that is the lower portion of a voltage divider network used for setting the output voltage. The capacitor 23 (C3, 220 uf) is a filter capacitor for the VCC output voltage connected to L1 18A and having its other end grounded.

As discussed previously, 3 represents the electrical circuit for distribution of the regulated, fused and inductively isolated voltage to USB connector J1. A resettable fuse (PTC) F1 24 for voltage output to USB connector J1 is set for 2.6 amps and is connected to output Vcc its other end is attached to diode D3 24 to ensure any voltage applied as an input to the output pin will not adversely affect the system. The circuit proceeds to two parallel inductors 26, 27 having their other ends connected to VCC1. These inductors L2, L3 are placed in the circuit to eliminate any noise applied as input to the output pin. VCC1 is nominally 5.1V applied to USB connector J1. Capacitors C11, C13 (0.1 uf) 29, 28 respectively are employed to eliminate the possibility of data intrusion and are connected at one end to ground and at another end to a voltage divider network between connected resistors R13, R15.

Resistors R13 30 (75K) has its other end connected to inductors L2, L3, VCC1 and pin 1 Vbus+5V of pin connector 38; it is an upper portion of voltage divider network (R13) used to set D+ to a voltage compliant with Apple requirements for charging. R15 32 (49.9 k) is grounded at one end and connected to pin 3 D+ of pin connector 38 as well as previously described; it is a lower portion of voltage divider network (R15) used to set D+ to a voltage compliant with Apple requirements for charging. Similarly, resistor 31 (R14, 43.2 k) is an upper portion of voltage divider network used to set D− to a voltage compliant with Apple requirements for charging whilst the lower lower portion of voltage divider network is a resistor 33 (R16, 49.9 k) used to set D− to a voltage compliant with Apple requirements for charging. Resistor 33 has one end grounded and its other end attached to resistor 31; this same nodal point is connected to D− voltage of pin 2 of J1 pin connector 38.

This point is also connected to a terminal of two parallel capacitors 34 (C14, 0.1 uF) and 35 (C12, 0.1 uF); these are employed to eliminate the possibility of data intrusion and are connected at one end to ground and at another end to a voltage divider network between connected resistors R14, R16. It should be apparent from FIG. 3 that one terminal each of resistors 30, 31 to inductors 26, 27 and are further connected to pin 1 of pin connector 39 VBUS+5V and further to resistor 36 (R5, 220) which is a voltage/current limiting resistor for LED1. The other terminal of resistor 36 is connected to LED1 37 which provides indication of connection to a USB port. Thus, this LED1 indicator 37 shows when USB J1 is active and available when lit. The other connection of LED1 indicator 37 is connected to P5 Jumper pins 57 to allow for indicator LED1 and LED2 to be lit, when M5 is installed across both pins. M5 is a jumper—so that the LEDs are enabled when attached or disabled when not attached.

Both items 38 J1 and 39 J2 represent two USB right angle 4 pin connectors being utilized to receive connection of an input device. Pin 4 of both 38, 39 are connected to ground and pin 5 of both are connected to chassis ground. VCC2 40 is nominally 5.1V applied to USB connector J2 across capacitor 41 (C18, 10 pF) that eliminates high frequency electrical components on the power bus that is grounded on its other end.

Capacitors C17, C20 (0.1 uf) 42, 43 respectively are connected parallel to one another and are employed to eliminate the possibility of data intrusion; further these are connected at one end to ground and at another end to a voltage divider network between connected resistors 46, 47 (R18, 43.2 k, R20, 49.9 k); this nodal point is also connected to pin 2 of J2 39. Resistor 47 has its other end connected to ground whilst resistor 46 has its other terminal connected to J2 39 and to VCC2 44. Resistor 45 (R6, 220) is a voltage/current limiting resistor for LED2 56 that is connected to 57 and LED1 37. LED2 56 is an indicator that USB J2 is active and available.

Resistor 46 (R18, 43.2 k) is an upper portion of voltage divider network used to set D− to a voltage compliant with Apple requirements for charging whilst the lower portion of voltage divider network is a resistor 47 (R20, 49.9 k) used to set D− to a voltage compliant with Apple requirements for charging. Resistor 47 has one end grounded and its other end attached to resistor 46; this same nodal point is connected to D− voltage of pin 2 of J2 pin connector 39. This point is also connected to a terminal of two parallel capacitors 42 (C17, 0.1 uF) and 43 (C20, 0.1 uF); these are employed to eliminate the possibility of data intrusion and are connected at one end to ground and at another end to a voltage divider network between connected resistors R18, R20.

Resistors R17 48 (75K) has an end connected to inductors L4, L5, VCC2, pin 1 V Bus of pin connector 39 and an end of resistor 46; it is an upper portion of voltage divider network (R17) used to set D+ to a voltage compliant with Apple requirements for charging at its other nodal point with resistor 49. Resistor 49 (R19, 49.9 k) is grounded at one end and connected to pin 3 D+ of pin connector 39 as well as previously described; it is a lower portion of voltage divider network (R19) used to set D+ to a voltage compliant with Apple requirements for charging.

An end of two parallel inductors 50 (L4), 51 (L5) are connected to VCC2 and are connected to resistors 46, 48 and VBus pin 1 of pin connector 39. These inductors L4, L5 are placed in the circuit to eliminate any noise applied as input to the output pin. VCC2 is nominally 5.1V applied to USB connector J2. Capacitors C16, C19 (0.1 uf) 54, 55 respectively are employed to eliminate the possibility of data intrusion and are connected at one end to ground and at another end to a voltage divider network between connected resistors 48, 49.

As discussed previously, item 4 represents the electrical circuit for distribution of the regulated, fused and inductively isolated voltage to USB connector J2. A resettable fuse (PTC) F2 53 for voltage output to USB connector J2 is set for 2.6 amps and is connected to output Vcc and its other end is attached to diode D2 52 to ensure any voltage applied as an input to the output pin will not adversely affect the system.

VCC1 58 is nominally 5.1V applied to USB connector J2 across capacitor 59 (C15, 10 pF) that eliminates high frequency electrical components on the power bus that is grounded on its other end. It should be understood that VCC 1 58, 59 along with VCC2 40, 41 permits separate USB's. They are separated so that there is no cross talk or interconnecting between them and to ensure the integrity of each individual USB. Thus, shorting one does not affect the other/or one can not absorb all the power.

Item 5 describes the provision of voltage to other power strip stages so that primary voltage is fed to other USB connector ports 60-63, J3-J6 on other strips.

It should be apparent that the particular embodiments herein are exemplary and that numerous changes are possible and these would fall within the scope of the appended claims. For example, including the USB ports on the same side or on the opposite side of the electronic board/housing or even at their ends. Additionally, it is envisioned that the Bar Juice power strip is modifiable to have more than two USB connection ports servicing other USB enabled devices.

Thus, the above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. An expandable power distribution device comprising:
    a housing having
        an electronic support device attached therein
        an input dc power port capable of receiving DC power different than a USB voltage attached to the electronic support device;
        an output dc power port capable of transmitting DC power different than a USB voltage attached to the electronic support device and
        a first USB charging port attached to the electronic support device.

2. The expandable power distribution device of claim 1, further comprising:
    a power regulation device attached to the input dc power port.

3. The expandable power distribution device of claim 1, further comprising:
    a power regulation device attached to the output dc power port.

4. The expandable power distribution device of claim 1, wherein the housing further comprises:
    a linear housing.

5. The expandable power distribution device of claim 1, wherein the input dc power port is located at an end of the electronic support device.

6. The expandable power distribution device of claim 1, wherein the output dc power port is located at an end of the electronic support device.

7. The expandable power distribution device of claim 1, wherein the input dc power port is located at an end of the electronic support device and the output dc power port is located at an opposite end of the electronic support device.

8. The expandable power distribution device of claim 5, wherein the input dc power port is located at an end of the electronic support device.

9. The expandable power distribution device of claim 5, wherein the output dc power port is located at an opposite end of the electronic support device.

10. The expandable power distribution device of claim 1, further comprising a second USB charging port attached to the electronic support device.

11. The expandable power distribution device of claim 1, wherein the electronic device has two narrow ends and two longitudinal sides.

12. The expandable power distribution device of claim 11, wherein the first USB charging port is located on a longitudinal side of the electronic support device.

13. The expandable power distribution device of claim 12, further comprising:
a second USB charging port located on a longitudinal side of electronic support device.

14. The expandable power distribution device of claim 13, wherein the first USB charging port and the second USB charging port are on the same longitudinal side of the electronic support device.

15. The expandable power distribution device of claim 13, wherein the first USB charging port and the second USB charging port are on opposite longitudinal sides of the electronic support device.

16. A power cascading strip comprising:
a first device compartment having
a first opening in the first device compartment for the placement therein of
a first DC power beyond USB voltage connection device capable of receiving DC power different than a USB voltage therein where the first DC power beyond USB voltage connection device is attached to a circuit board located within the first device compartment and
a second opening in the first device compartment for the placement therein of
a second DC power beyond USB voltage connection device capable of transmitting DC power different than a USB voltage therein where the second DC power beyond USB voltage connection device is attached to the circuit board and
a third opening in the first device compartment for the placement therein of a first USB charging power port attached to the circuit board.

17. The power cascading strip of claim 16, further comprising:
a fourth opening in the first device compartment for the placement therein of a second USB charging port attached to the circuit board.

18. The power cascading strip of claim 16, further comprising:
a power regulator circuit integrated with the circuit board.

19. The power cascading device of claim 16, further comprising:
a second device compartment distinct from the first device compartment such that the second device compartment has
a fourth opening in the second device compartment for the placement therein of
a third power connection device capable of receiving DC power different than a USB voltage therein where the third power connection device is attached to another circuit board located within the second device compartment wherein the third power connection device is connected to the second DC power beyond USB voltage connection device; and
a fifth opening in the second device compartment for the placement therein of
a fourth power connection device capable of transmitting DC power different than a USB voltage therein where the fourth power connection device is attached to the another circuit board; and
a sixth opening in the second device compartment for the placement therein of a second USB charging power port attached to the another circuit board.

20. A linear power strip assembly comprising:
an oblong circuit board situated within the linear power strip assembly having
a first power connection socket capable of receiving DC power outside a normal operating range of a USB voltage attached to the oblong circuit board
a second power connection socket capable of transmitting DC power outside a normal operating range of a USB voltage attached to the oblong circuit board and
a USB charging socket also attached to the oblong circuit board.

* * * * *